US007822426B1

(12) United States Patent
Wuersch

(10) Patent No.: US 7,822,426 B1
(45) Date of Patent: Oct. 26, 2010

(54) SYSTEM AND METHOD FOR SNAPPING A USER LOCATION TO A LANDMARK OF KNOWN LOCATION

(75) Inventor: Markus P. Wuersch, Blacksburg, VA (US)

(73) Assignee: Where, Inc., Boston, MA (US)

( * ) Notice: Subject to any disclaimer, the term of this patent is extended or adjusted under 35 U.S.C. 154(b) by 152 days.

(21) Appl. No.: 12/016,112

(22) Filed: Jan. 17, 2008

(51) Int. Cl.
*G01S 5/02* (2010.01)
(52) U.S. Cl. .................................... 455/456.1; 342/450
(58) Field of Classification Search ............ 342/357.13, 342/357.14, 450–465; 455/456.1–456.6
See application file for complete search history.

(56) References Cited

U.S. PATENT DOCUMENTS

| | | | |
|---|---|---|---|
| 6,249,252 B1 | 6/2001 | Dupray | |
| 6,757,544 B2 | 6/2004 | Rangarajan et al. | |
| 6,766,245 B2 | 7/2004 | Padmanabhan | |
| 6,806,830 B2 | 10/2004 | Panaski et al. | |
| 6,963,748 B2 * | 11/2005 | Chithambaram et al. | 455/456.1 |
| 6,978,258 B2 * | 12/2005 | Chithambaram | 706/8 |
| 7,199,754 B2 | 4/2007 | Krumm et al. | |
| 7,242,950 B2 * | 7/2007 | Suryanarayana et al. | 455/456.5 |
| 7,565,155 B2 * | 7/2009 | Sheha et al. | 455/456.1 |
| 2005/0198286 A1 * | 9/2005 | Xu et al. | 709/225 |
| 2007/0276591 A1 * | 11/2007 | Lea et al. | 701/207 |

OTHER PUBLICATIONS

Heyer, Laurie, et al., "Exploring Expression Data: Identification and Analysis of Coexpressed Genes," Genome Research, http://www.genome.org, Cold Spring Harbor Laboratory Press, 1999, pp. 1105-1115.

* cited by examiner

*Primary Examiner*—Thomas H Tarcza
*Assistant Examiner*—Cassi Galt
(74) *Attorney, Agent, or Firm*—Cesari and McKenna, LLP

(57) ABSTRACT

In one embodiment, an initial estimated location of a mobile electronic device is determined using a location determination method (LDM). An accuracy for the LDM is determined. An initial set of landmarks is determined based upon the initial estimated location and the determined accuracy. For each landmark in the initial set of landmarks, a likelihood is calculated that the mobile electronic device is located about that landmark. A landmark from the initial set of landmarks is selected based on the likelihoods. The location of the mobile electronic device is set to a known location of the selected landmark.

26 Claims, 12 Drawing Sheets

SYSTEM AND METHOD FOR SNAPPING A USER LOCATION TO A LANDMARK OF KNOWN LOCATION

BACKGROUND

1. Technical Field

The present invention relates generally to location determination and more specifically to determining the location of a mobile electronic device.

2. Background Information

A variety of different types of mobile electronic devices (such as cellular telephones, personal digital assistants (PDAs), Personal Navigation Devices (PNDs), hand-held computers, a notebook computer, etc.) are capable of determining their approximate geographic locations. Typically, such devices turn to one of several location determination methods (LDMs). For example, some mobile electronic devices rely upon the global positioning system (GPS) to determine their location. Such devices typically include a GPS receiver, having an antenna tuned to frequencies transmitted by GPS satellites, and a highly-stable clock, that together permit location determination using a GPS algorithm. In some cases, the algorithm may implement Assisted GPS (A-GPS) where additional information provided from a remote assistance server is used to improve location accuracy. For example, an assistance server may interoperate with the device to compare fragmentary signals received at the device with complete signals received at the server. Similarly, the assistance server may provide orbital data for GPS satellites and/or information concerning ionospheric conditions to the device.

Other mobile electronic devices may forgo GPS, and instead determine their location based upon the known locations of cell sites of a cellular phone network. Such devices typically establish a wireless connection with one or more nearby cell sites. The location of the device is approximated based upon the location of the nearest cell site (for example the one with the strongest signal), determined by triangulation among the locations of several cell sites, or by another similar technique.

Other mobile electronic devices may determine their location based upon the known locations of network access points, for example Wireless Fidelity (Wi-Fi) access points, Worldwide Interoperability for Microwave Access (WiMAX) access points, or similar network access points. The location of the device is approximated based upon the location of the nearest access point, determined by triangulation among several access points, or determined by another technique.

Still other mobile electronic devices rely upon interaction with a user to determine their location. In such cases, the user may be prompted to report their approximate location by inputting a text-string, for example a street address; by selecting a point on a displayed map; or by some other interactive technique. In this manner, the device comes to know its approximate location.

The location determination capabilities of portable electronic devices has led to a proliferation of location-based services (LBS's). An LBS is a service that exploits knowledge of a device's location, and/or the location of other devices, to provide location-specific information, notifications, interactive capabilities, and/or other functionality. For example, an LBS may provide information regarding nearby services, such as identifying the nearest automatic teller machine (ATM); information regarding nearby businesses, such as identifying the nearest restaurant of a particular type; information concerning the local environment, such as providing a local weather report; or other types of location-specific information. Similarly, an LBS may provide proximity-based alerts, for example, a notification of an ongoing sale when a user is proximate a particular store, or a notification that a "buddy" is nearby. Further, an LBS may offer access to certain interactive applications, games, downloadable-content, and the like, when a user is proximate a particular location. A wide variety of other LBS's are also possible.

While some LBS's do not require highly-accurate location knowledge, the usefulness of other LBS's may be seriously impaired by inaccuracies. For example, an LBS that provides a local weather report may tolerate considerable location-error absent any adverse impact on the user experience. In contrast, an LBS designed to alert a user of an ongoing sale as they enter a store may function poorly if knowledge of the user's location is inaccurate by a few hundred feet. The alert may be inadvertently triggered when a user simply walks or drives down a street within a few blocks of the store, more likely annoying the user than enticing them to buy merchandise. Similarly, an LBS designed to identify the nearest ATM may misdirect a user if knowledge of a user's location is inaccurate. The user may become annoyed upon noticing a closer ATM, losing confidence in the LBS.

Further, many existing LDMs do not provide locations in the most specific or most convenient form. For instance, a user of a mobile electronic device may be located at a place called "Corner Coffee" at the address of "120 Main Street." A conventional LDM may simply identify a geographic position, for example, latitude and longitude, for the user. The name of the place and address however are more descriptive and are often preferable. For example, if the user desires to share his or her location with others, the place name and street are clearly more intelligible to another human. Similarly, if targeted content is to be displayed to the user, the place name and street address is more specific than the geographic position, and thus content can be better directed.

While more advanced location-determination infrastructure and/or more advanced hardware in mobile electronic devices may be employed in attempts to improve location accuracy and address the other above discussed shortcomings, such approaches are often commercially impracticable. There are considerable sunk costs in existing location determination infrastructure, and improved systems are likely to only slowly emerge into widespread use. Similarly, there is a sizable base of existing mobile electronic devices. Despite their limitations, these devices are likely to be in service for some time into the future.

Accordingly, there is a need for a system and method to more accurately determine the location of a mobile electronic device, which is compatible with existing location determination infrastructure and mobile electronic device hardware.

SUMMARY

The present disclosure describes a system and method for determining a mobile electronic device's location to a greater level of accuracy. Broadly speaking, the system and method operate by identifying an initial estimated location of the device using one of a number of LDMs. Based on the initial estimated location, and on an accuracy corresponding to the particular LDM employed, an initial set of landmarks is determined. This set of landmarks represents places of known location, including points of interest (POIs), user-specific places, previously visited places; and/or other types of places. Each landmark in the initial set is analyzed, and a likelihood that the mobile electronic device is located near that landmark is calculated.

In one implementation, the likelihood is calculated by a modular Likelihood Engine that utilizes a plurality of separate probability modules. Each probability module determines likelihood in a different manner. For example, a module may calculate likelihood based upon certain determined distances, landmark patterns, temporal patterns, knowledge of business hours, knowledge of event occurrences, season or weather knowledge, common place names, repeat visit tracking and/or other types of factors or techniques.

The likelihood values generated by each of the probability modules are combined by an aggregation engine and an overall likelihood that the device is located proximate each landmark in the initial set is determined. Thereafter, the landmark with the highest likelihood is selected, and the device's location "snapped" to the known location of that landmark. That is, the device's location is assumed to be the known location of the landmark, rather than the initial estimated location returned by the LDM. In this manner, a more accurate measure of the device's location is achieved than is typically possible using the LDM alone.

BRIEF DESCRIPTION OF THE DRAWINGS

The description below refers to the accompanying drawings, of which.

DETAILED DESCRIPTION

Operational Environment

Figure 1:
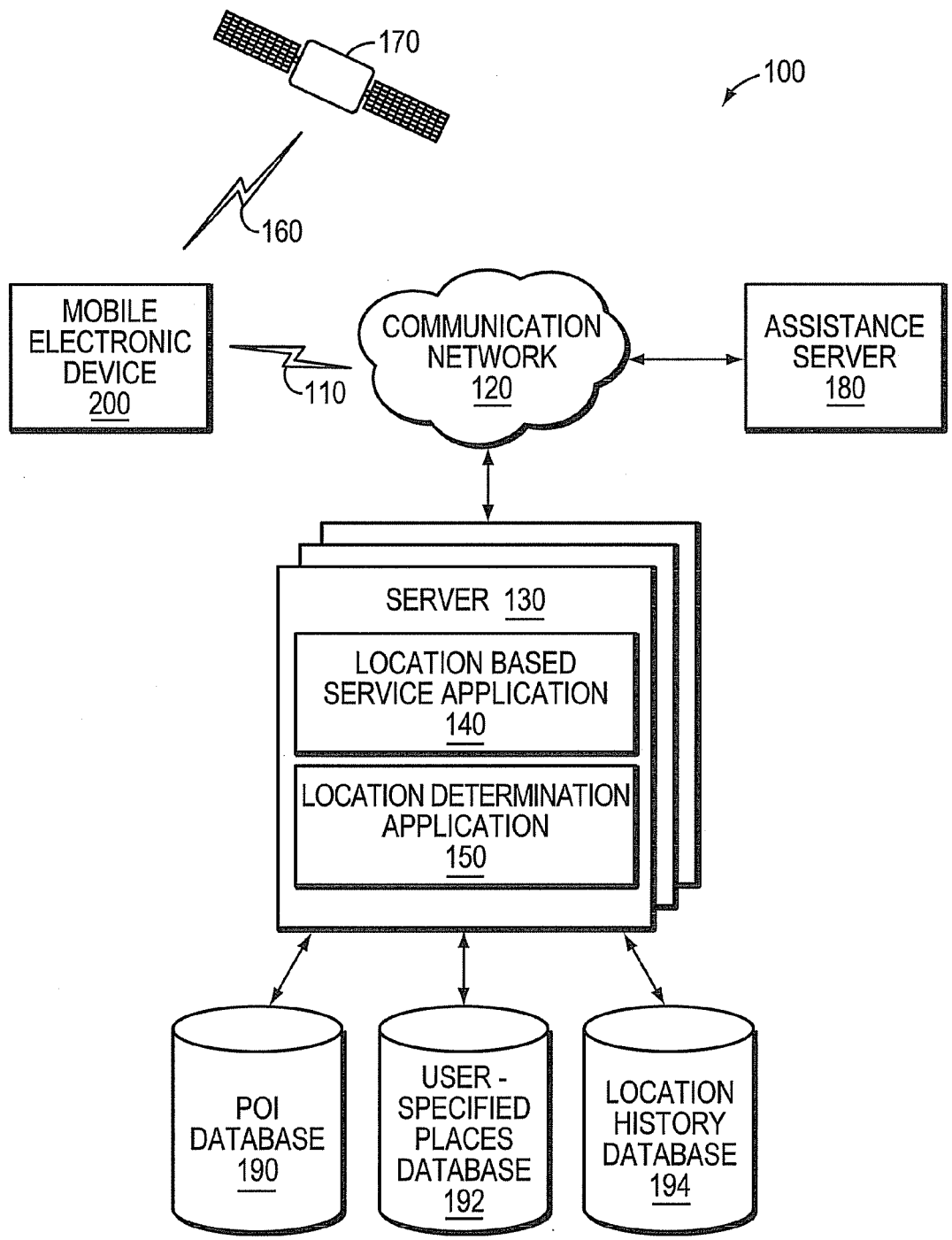
FIG. 1 is a block diagram of a example environment for operating a mobile electronic device.

FIG. 1 is a block diagram of a example environment 100 for operating a mobile electronic device 200. The mobile electronic device 200 may be any of a variety of types of devices, for example a cellular telephone, a personal digital assistant (PDA), a Personal Navigation Device (PND), a handheld computer, a notebook computer, or other type of movable device. The device 200 may interface via a connection 110 with a communication network 120. Depending on the form of the mobile electronic device 200, any of a variety of types of connections 110 and communication networks 120 may be used.

For example, the connection 110 may be Code division multiple access (CDMA) connection, a Global System for Mobile communications (GSM) connection, or other type of cellular connection. Such connection 110 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology. When such technology is employed, the communication network 120 may include a cellular network that has a plurality of cell sites of overlapping geographic coverage, interconnected by cellular telephone exchanges. These cellular telephone exchanges may be coupled to a network backbone, for example, the public switched telephone network (PSTN), a packet-switched data network, or to other types of networks.

In another example, the connection 110 may be Wireless Fidelity (Wi-Fi) connection, a Worldwide Interoperability for Microwave Access (WiMAX) connection, or another type of wireless data connection. In such an embodiment, the communication network 120 may include one or more wireless access points coupled to a local area network (LAN), a wide area network (WAN), the Internet, or other packet-switched data network.

In yet another example, the connection 110 may be a wired connection, for example an Ethernet link, and the communication network may be a local area network (LAN), a wide area network (WAN), the Internet, or other packet-switched data network. Accordingly, a variety of different configurations are expressly contemplated.

A plurality of servers 130 may be coupled via interfaces to the communication network 120, for example, via wired or wireless interfaces. These servers 130 may be configured to provide various types of services to the mobile electronic device 200. For example, one or more servers 130 may execute location based service (LBS) applications 140, which interoperate with software executing on the device 200, to provide LBS's to a user. Such an LBS typically utilizes knowledge of the device's location, and/or the location of other devices, to provide location-specific information, notifications, interactive capabilities, and/or other functionality to a user. Knowledge of the device's location, and/or the location of other devices, may be obtained through interoperation of the device 200 with a location determination application 150 executing on one or more of the servers 130. As discussed in more detail below, the location determination application 150 may implement a novel technique for determining the location of the device 200 to a greater level of accuracy than possible using prior known techniques.

Figure 2:
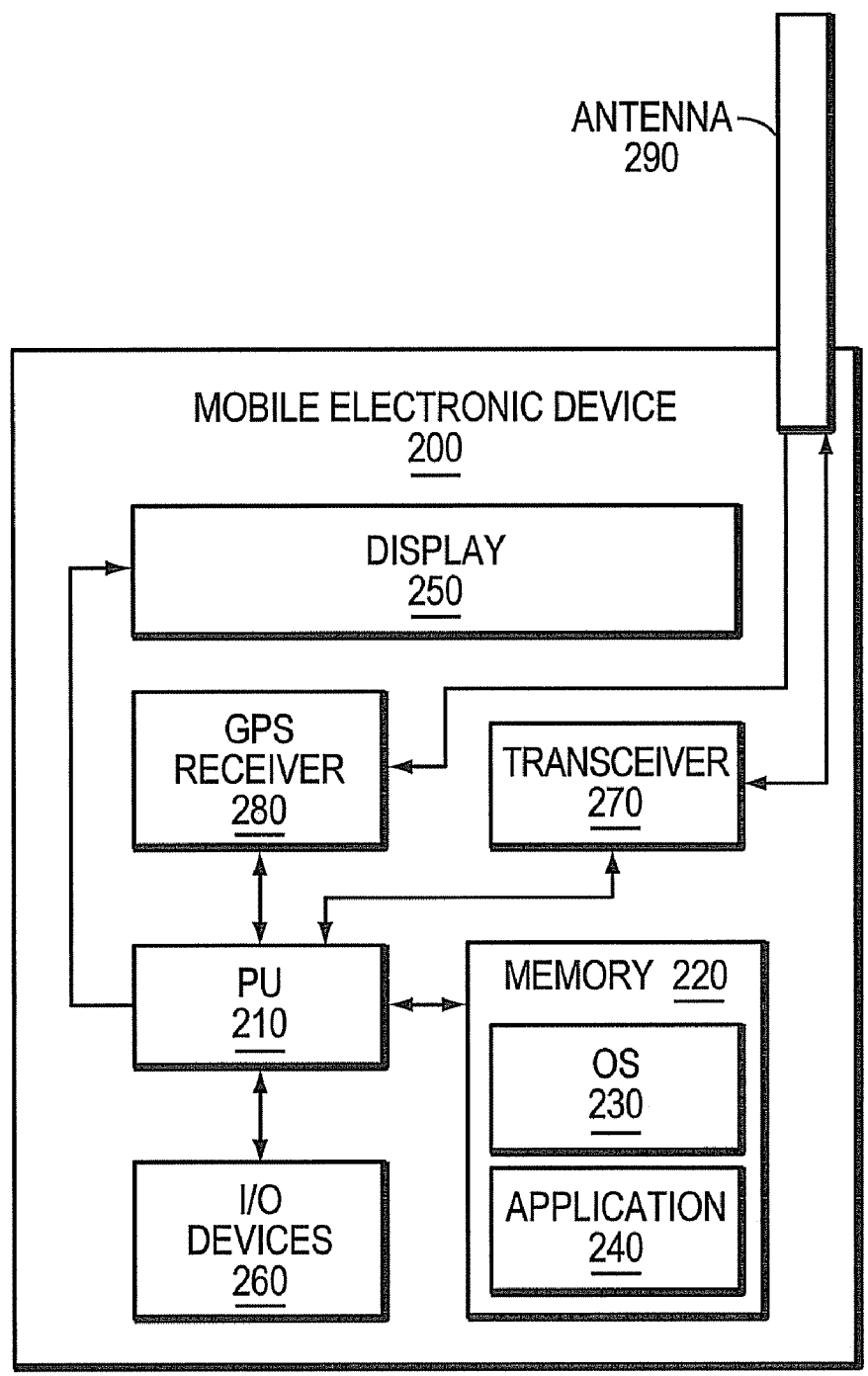
FIG. 2 is a block diagram of an example mobile electronic device.

FIG. 2 is a block diagram of an example mobile electronic device 200. The device 200 may include a processing unit (PU) 210. The PU 210 may be any of a variety of different types of commercially available processors suitable for mobile devices, for example, an XScale architecture microprocessor, a Microprocessor without Interlocked Pipeline Stages (MIPS) architecture processor, or another type of processor. A memory 220, such as a Random Access Memory (RAM), a Flash memory, or other type of memory, is typically accessible to the processor. The memory 220 may be adapted to store an operating system (OS) 230, as well as application programs 240, such as a mobile location enabled application that may provide LBS's to a user. The processor 210 may be coupled, either directly or via appropriate intermediary hardware, to a display 250 and to one or more input/output (I/O) devices 260, such as a keypad, a touch panel sensor, a microphone, etc. Similarly, in some embodiments, the processor 210 may be coupled to a transceiver 270 that interfaces with an antenna 290. The transceiver 270 may be configured to both transmit and receive cellular network signals, wireless data signals, or other types of signals via the antenna 290, depending on the nature of the device 200. In this manner the connection 110 with the communication network 120 may be established. Further, in some configurations, a GPS receiver 280 may also make use of the antenna 290 to receive GPS signals.

Location Determination

As discussed above, certain LBS's may require, or operate best with, highly accurate knowledge of the location of a mobile electronic device 200. The present disclosure describes a technique for determining a device's location to a greater level of accuracy than previously generally achievable.

Figure 3:
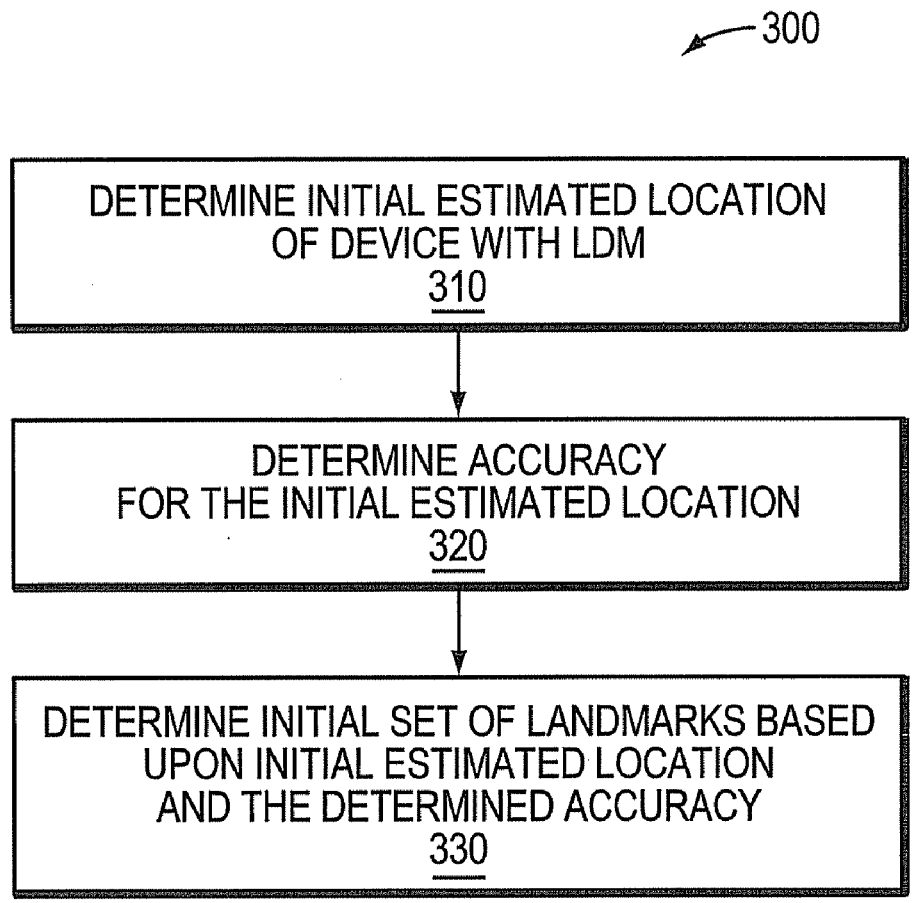
FIG. 3 is a flow diagram depicting an example sequence of steps for determining an initial set of landmarks at which the mobile electronic device may be located.

FIG. 3 is a flow diagram depicting an example sequence of steps for determining an initial set of landmarks at which a mobile electronic device 200 may be located. Such steps may be implemented by computer executable instructions of the location determination application 150 executing on the one or more of the servers 130. Further, at least some portions of the steps may be implemented by computer executable instruction of the OS 230 or an application program 240 executing on the device 200, by special purpose hardware devices, or by other appropriate components.

At step 310, an initial estimated location of the device 200 is determined using one of a number of LDMs. The particular LDM employed may depend upon the capabilities of the device 200, the location determination infrastructure accessible to the device, and/or other factors.

For example, in reference to FIGS. 1 and 2, if the device 200 includes an A-GPS enabled GPS receiver 280, is able to receive GPS signals 160 transmitted by GPS satellites 170, and is able to receive comparison data, telemetry data, and/or ionospheric condition data from one or more assistance servers 180, A-GPS may be used to determine the initial estimated location.

Alternatively, if the device 200 is capable of communicating with cell sites, and if data records that indicate the locations of the cell sites are accessible, a nearest cell site association operation, or a triangulation calculation, may be performed to determine the initial estimated location.

Similarly, if the device 200 is capable of communicating with access points, and if data records indicating the locations of such access points are accessible, a nearest access point association operation, or a triangulation calculation, may be performed to determine the initial estimated location.

Further, if the device 200 is so configured, it may prompt a user to self-report a location by inputting a text-string, for example a street address; by making a selection, for example by selecting a point on a map; or by some other interactive technique. The inputted text-string may be provided via the connection 110 and communication network 120 to a geocoding application executing on a server 130. The geocoding application may translate the text-string into geographic coordinates. Such geographic coordinates may be used as the initial estimated location. A wide variety of other LDMs may be alternatively employed.

At step 320, an accuracy is determined for the initial estimated location. The accuracy may be based upon an assumed accuracy for the particular LDM employed.

For example, if the LDM is A-GPS, an assumed accuracy of approximately 300 feet may be used. Such assumed accuracy provides for worst-case performance that may be experienced in an urban area, where line-of-sight to satellites 170 may be obstructed, and multi-path interference may be considerable. Further, the assumed accuracy takes into account the normal distribution (i.e., Gaussian distribution) of accuracy for locations calculated by A-GPS. That is, the device 200 is more likely actually located at the location returned in the A-GPS calculation than remote therefrom.

Similarly, if the LDM is associated with the known location of a nearest cell site, an assumed accuracy of approximately 2-10 miles may be used. Such assumed accuracy provides for worst-case spacing of cell sites, for example extended spacing common in suburban areas. Further, the assumed accuracy takes into account the generally even distribution of accuracy for locations calculated by this LDM. That is, there is typically an equal likelihood that the location provided (i.e. the location of the cell site) is the actual location of the device 200, as there is that it is highly inaccurate (for example, the device 200 is actually located at the maximum range of the cell site).

Likewise, if the LDM employed is associated with the known location of the nearest access point, and assuming that the access point is implementing Wi-Fi, an assumed accuracy of approximately 100 feet may be used. This assumed accuracy may account for the even distribution of accuracy typically representative of this LDM.

Further, if the LDM involves self-reporting of a location, the assumed accuracy may be determined based upon the specificity of the information provided by the user. For example, if the user inputs a text string including only city and state names, an assumed accuracy of approximately 5 miles may be used, corresponding to a citywide scope. Alternatively, if the user inputs a string that also includes a street address, an assumed accuracy of about 50 ft may be used, corresponding to a building-wide scope. As with other of the above described LDMs, it may be assumed that self-reported locations have an even accuracy distribution.

The assumed accuracy for the LDM may be used directly or, in some cases, further refined. For example, if A-GPS is employed as the LDM, the assumed accuracy may be refined by adjustments for actual building density in the vicinity of the mobile electronic device 200, if such information is obtainable. The assumed accuracy may be adjusted to indicate greater accuracy for areas with low building density, or adjusted to indicate decreased accuracy for dense urban areas. Similarly, if A-GPS is employed, the assumed accuracy may be adjusted in light of an accuracy history. Further, if the LDM is based upon the known location of cell towers or access points, the accuracy can be refined if the density of such cell towers or access points is known for the general area. Likewise, if in the past a user manually associated his or her location with nearby landmarks, the difference between the user's A-GPS calculated location and the known location of landmarks may show the accuracy typical in the area. If sufficient quantities of such data are available, the assumed accuracy may be adjusted in light thereof. Alternatively a variety of other refinement techniques may be employed.

At step 330, an initial set of landmarks is determined, based upon the initial estimated location and the determined accuracy. As used herein the term "landmark" should be interpreted broadly to encompass a variety of types of places of known location, including points of interest (POIs), such as attractions, businesses, restaurants, etc; user-specific places, for example a user's home, workplace, friend's homes, etc.; previously visited places, whose location may have been previously determined; and/or other types of places. A record of landmarks for the geographic area covered by the system 100, or a portion thereof, may be stored in one or more databases 190-194 accessible to the location determination application 150. For example, a POI database 190, a user-specific places database 192, and a location history database 194 may be maintained.

Figure 4:
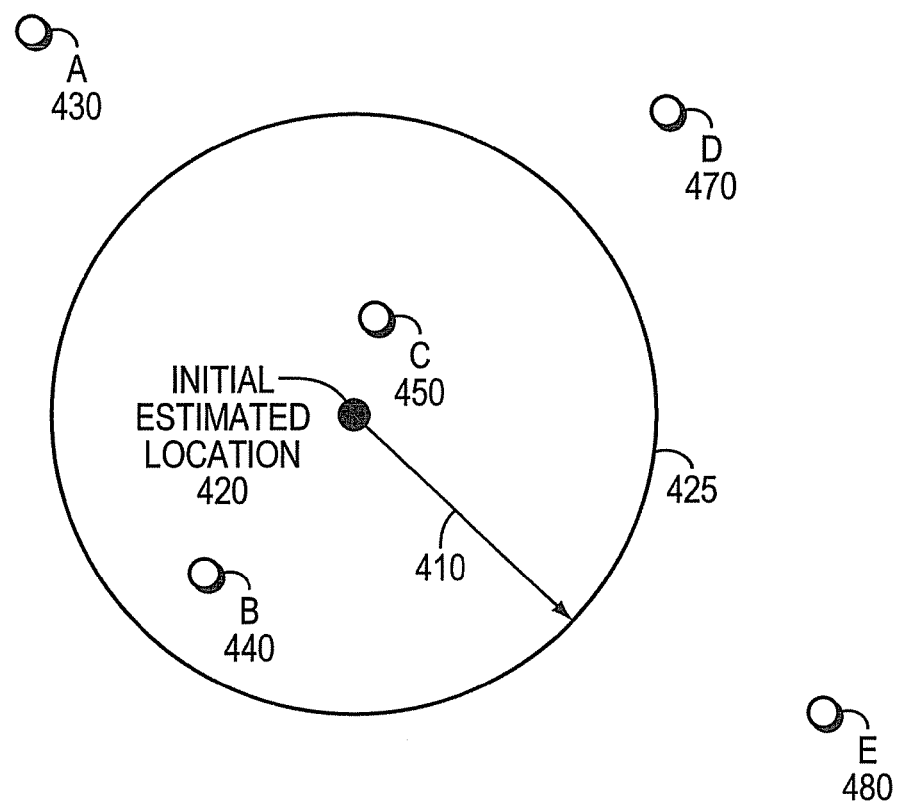
FIG. 4 is a schematic diagram illustrating the selection of an example initial set of landmarks based upon an initial estimated location and an accuracy.

To establish an initial set of landmarks, the location determination application 150 selects landmarks from the databases 190-194 that fall within a radius extending from the initial estimated location. Such radius may equal the determined accuracy of the LDM. For example, in reference to FIG. 4, an accuracy radius 410 may be envisioned to extend from an initial estimated location 420 to establish a circumference 425. Landmarks B 440 and C 450 fall within the circumference 430, and thus form an initial set of landmarks {A,B}. Landmarks A 460, D 470, and E 480 fall outside the circumference 425 and thus are excluded from the initial set.

Figure 5:
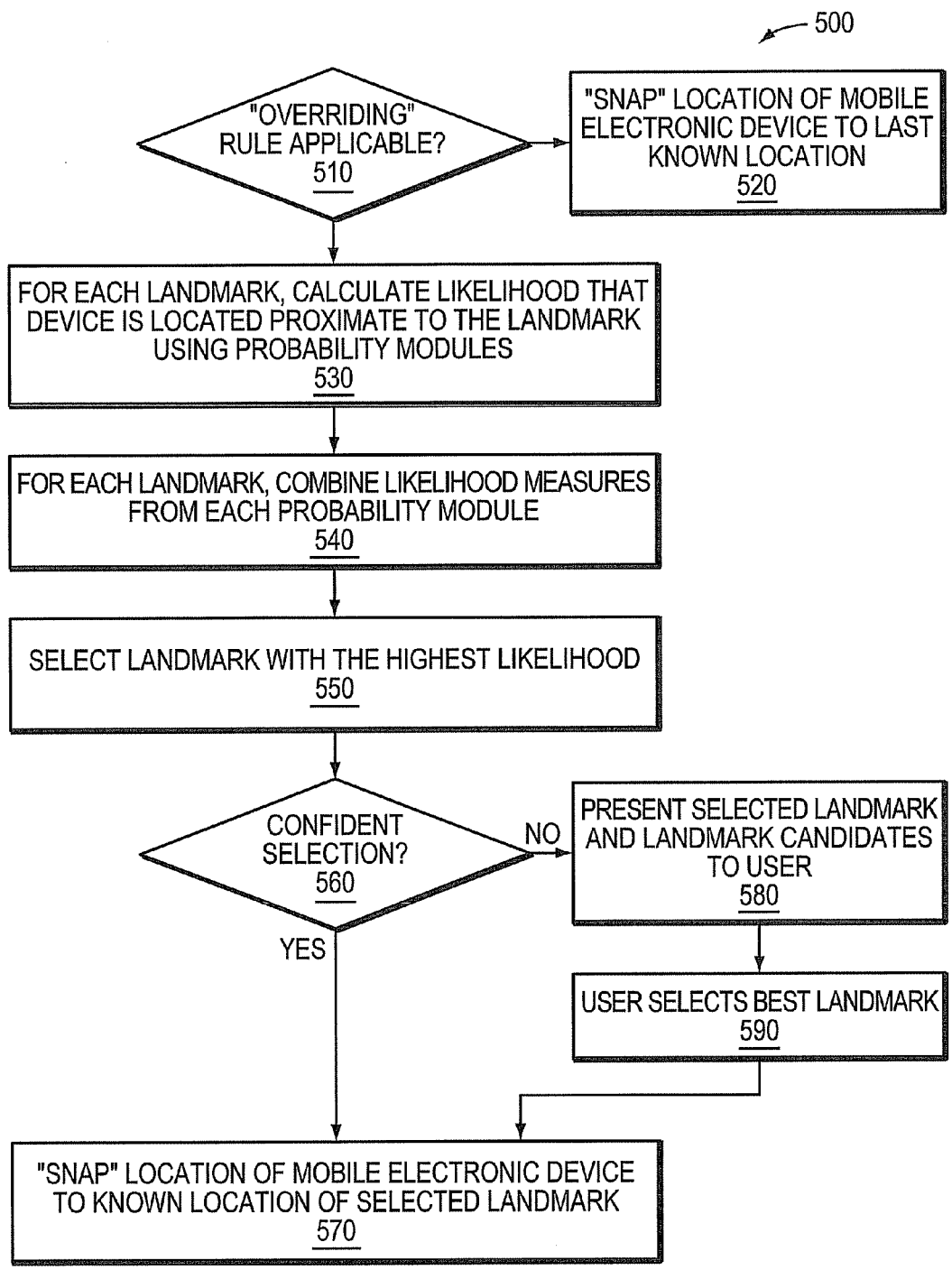
FIG. 5 is a flow diagram of an example sequence of steps for selecting a most likely landmark from the initial set and "snapping" the mobile electronic device's location thereto.

Once an initial set of landmarks is determined, it is analyzed and a single landmark selected therefrom for use as the mobile electronic device's location. FIG. 5 is a flow diagram of an example sequence of steps 500 for selecting a most likely landmark from the initial set, and "snapping" the mobile electronic device's location thereto. As used herein the term "snap" should be interpreted broadly to encompass setting, assigning, providing as, or otherwise using the location as the location of the device 200. The steps shown in FIG. 5 may be implemented by computer executable instructions of the location determination application 150 executing on the one or more of servers 130. Further, at least some portions of the steps may be implemented by computer executable instructions of the OS 230 or an application program 240 executing on hardware of the mobile electronic device 200, by special purpose hardware devices, or by other appropriate components.

At step 510, an "overriding" rules check is performed. In some cases, certain "overriding" rules may preempt the results returned from the Likelihood Engine 610. These rules may be based on certain generalizations regarding user activity. For example, a generalization may be made that if the user of the device 200 is still within a same general vicinity for a certain time frame, for example, 30 minutes, the location of the device 200 has not changed. Likewise, if the user of the device 200 is still within or returning to the same vicinity and a last n user-selected locations for the device 200 are all identical, a generalization may be made that the device 200 is still there. Similarly, a variety of other rules are possible. When such rules apply, it may be assumed the device 200 is still about the last landmark associated with the device 200. In such cases, execution may proceed to step 540 where the location of the device 200 is automatically "snapped" to a last known location.

Figure 6:
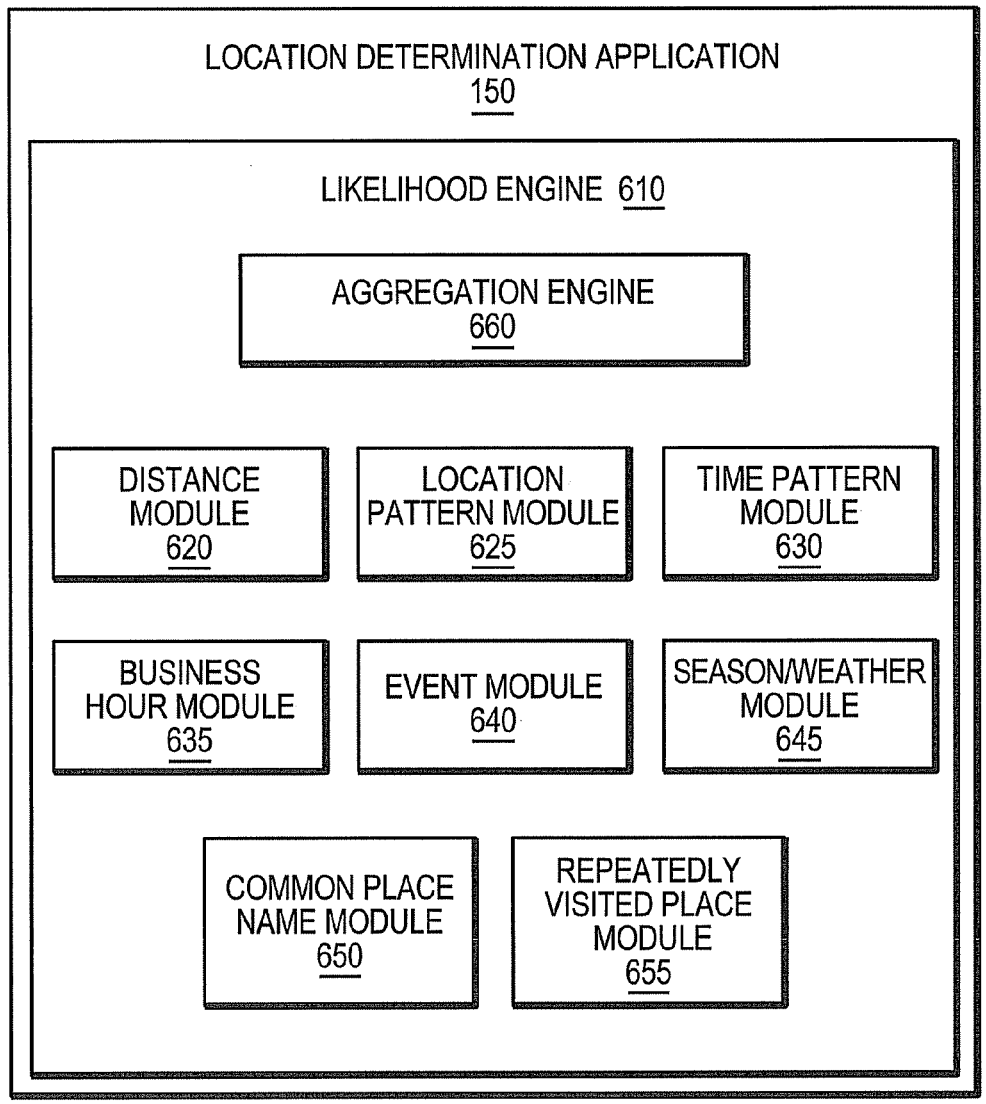
FIG. 6 is a block diagram of a location determination application that includes a Likelihood Engine having a plurality of separate probability modules.

If the one or more "overriding" rules do not apply, at step 530, each landmark in this initial set is analyzed, and a likelihood that the device 200 is located proximate to the landmark is calculated. This calculation may be performed by a Likelihood Engine. In reference to FIG. 6, the Likelihood Engine 610 may include a plurality of separate probability modules 620-655, that each determines a likelihood that the device 200 is located at a landmark. Each probability modules 620-655 may implement a different algorithm, which makes different assumptions regarding user activity, societal practices, and/or the environment, to calculate likelihood values.

For purposes of illustration, the probability modules 620-655 may be classified into two general types. A first type is history-dependent and analyzes landmarks based upon patterns occurring in places previously visited by the user (within a particular timeframe). The history-dependent probability modules may include a location pattern module 625, a time pattern module 630, a repeatedly visited places module 655, as well as other modules. The second type is history-independent and analyzes landmarks independent of previous activity. Such modules instead look to intrinsic properties of the landmarks and the current environment. History-independent probability modules may include a distance module 620, a business hour module 635, an event module 640, a season/weather module 645, a common place name module 650, as well as other modules. Details of the inner operation of each of the probability modules 620-655 is reserved for discussion further below.

Each probability module 620-655 generates a likelihood value for each landmark of the initial set. This likelihood represents the probability that the landmark is the actual location of the device 200. These likelihood values may be normalized.

In some instances the assumptions underlying a particular probability module may not be applicable to a particular landmark of the initial set of landmarks. For instance, as will become apparent in the description below, the assumptions underlying the business hour module 635 may not be applicable to landmarks that do not have associated business hours. In such a case, the inapplicable module may simply not be used with the particular landmark. In this manner, results from inapplicable modules may be prevented from inadvertently skewing landmark selection.

At step 540, the likelihood values generated by each of the probability modules 620-655 (or at least those that are applicable) are combined by an aggregation engine 660 of the Likelihood Engine 610, to generate an overall likelihood that the device 200 is located at each landmark in the initial set. In one implementation, the aggregation engine 660 calculates a normalized sum (e.g., an average) of the likelihood values from the probability modules 620-655, for instance by implementing the equation:

$$L = \frac{L_1 + L_2 + \ldots L_n}{n} \quad (1)$$

where L is the overall likelihood for a particular landmark, $L_1$, $L_2 \ldots$ to $L_n$ are likelihood values generated by probability modules 620-655, and n is the number of probability modules 620-655 for which likelihood values are provided.

Alternatively, the aggregation engine 660 may assign weights to each likelihood values based on preferences for particular probability modules 620-655, for instance by implementing the equation:

$$L = \frac{W_1 L_1 + W_2 L_2 + \ldots W_n L_n}{n} \quad (2)$$

where $W_1$, $W_2 \ldots$ to $W_n$ are weights associated with each probability module 620-655.

At step 550, the landmark of the initial set of landmarks with the highest overall likelihood is selected, based on the overall likelihoods returned by the aggregation engine 660.

At step 560, is a confidence determination is performed on the selected landmark. The confidence determination may compare the likelihood the selected landmarks is the location of the device 200, with the likelihood one or more other landmark candidates in the initial set are the location of the device 200, yielding a statistical measure of selection confidence. If this confidence measure exceeds a predetermined threshold, then the match is declared confident Likewise, if the measure falls below the threshold, the selection is declared non-confident.

If the selection was declared confident, then execution proceeds to step 570 where the location determination application 150 "snaps" the location of the mobile electronic device 200 to the known location of the selected landmark. That is, the device 200 may be set to the known location of the selected landmark, and the landmark's location used rather than the initial estimated location returned by the LDM.

If the selection was declared non-confident, execution proceeds to step 580, where the user of the device 200 is presented with a description of the selected landmark, as well as one or more other landmark candidates, for example via the display 250. Depending on the specific implementation, the description may be text-based, such as a landmark name; graphical, such as a map marked with icon; or take on some other form.

At step 590 the user manually selects a best landmark from those presented, for example by using an I/O device 260 of the mobile electronic device 200. Thereafter, exaction proceeds to step 550, where the location determination application 150 "snaps" the location of the device 200 to the location of the manually selected landmark. The location of the device 200 may then be reported to a user, for example via the device's display 250, used with one or more LBS's, for example provided to location based service application 140, or otherwise utilized.

Probability Modules

To better illustrate the operation of the location determination technique, the inner operation of each of the probability modules 620-655 of the Likelihood Engine 610 will now be discussed in more detail.

Distance Module

A distance module 620 of the Likelihood Engine 610 may operate on the assumption that it is more likely that a user of the device 200 is at a landmark of the initial set close to the initial estimated location, than at a landmark further away from the initial estimated location. For example, in reference to FIG. 4, Landmark C 450 may be accorded a greater likelihood than Landmark B 440, based on its closer proximity to the initial estimated location 420.

Figure 7:
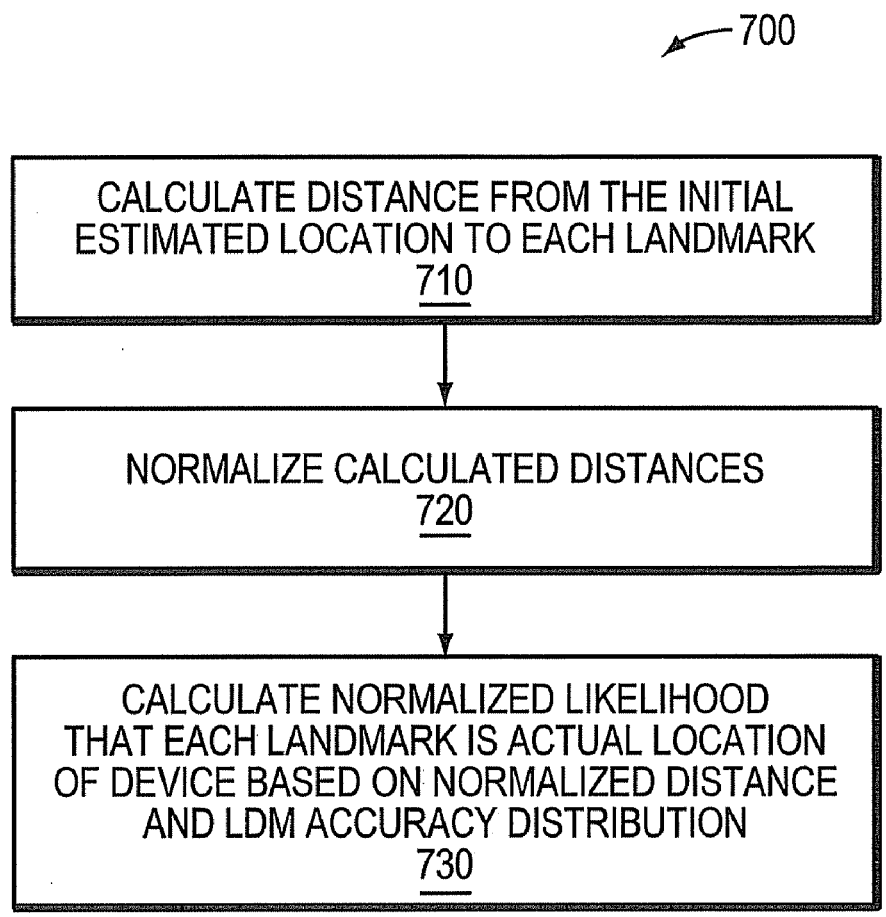
FIG. 7 is a flow diagram of an example sequence of steps that may be executed by a distance module to produce a likelihood value.

FIG. 7 is a flow diagram of an example sequence of steps 700 that may be executed by the distance module 620 to produce a likelihood value. At step 710, the distance from the initial estimated location 420 to each landmark in the initial set is calculated. At step 720, the distances are normalized. For example, the distances may be divided by the accuracy of the LDM. The result of such normalization may be a value between zero and one. At step 730, the normalized likelihood each landmark is the actual location of the mobile electronic device 200 is calculated. Such likelihoods are based on the normalized distance and the accuracy distribution of the LDM, and may be determined by the equation:

$$L_{distance} = \exp\left(-\left(\frac{D_{normalized}}{\text{RMS}}\right)^2\right) \quad (2)$$

where $L_{distance}$ represents the normalized likelihood, $D_{normailzed}$ is the normalized distance from the initial estimated location 420 to the landmark, and RMS is a root mean square (i.e., the quadratic mean) of the accuracy distribution of the LDM. In some cases, RMS may be approximated by a constant to simplify the calculation.

The assumptions underlying the distance module 620 typically are appropriate for initial estimated locations produced by LDMs that have a normal, or other non-even, accuracy distribution. In some implementations, use of the module 620 may be confined to situations where such LDMs are employed.

Location Pattern Module

Figure 8:
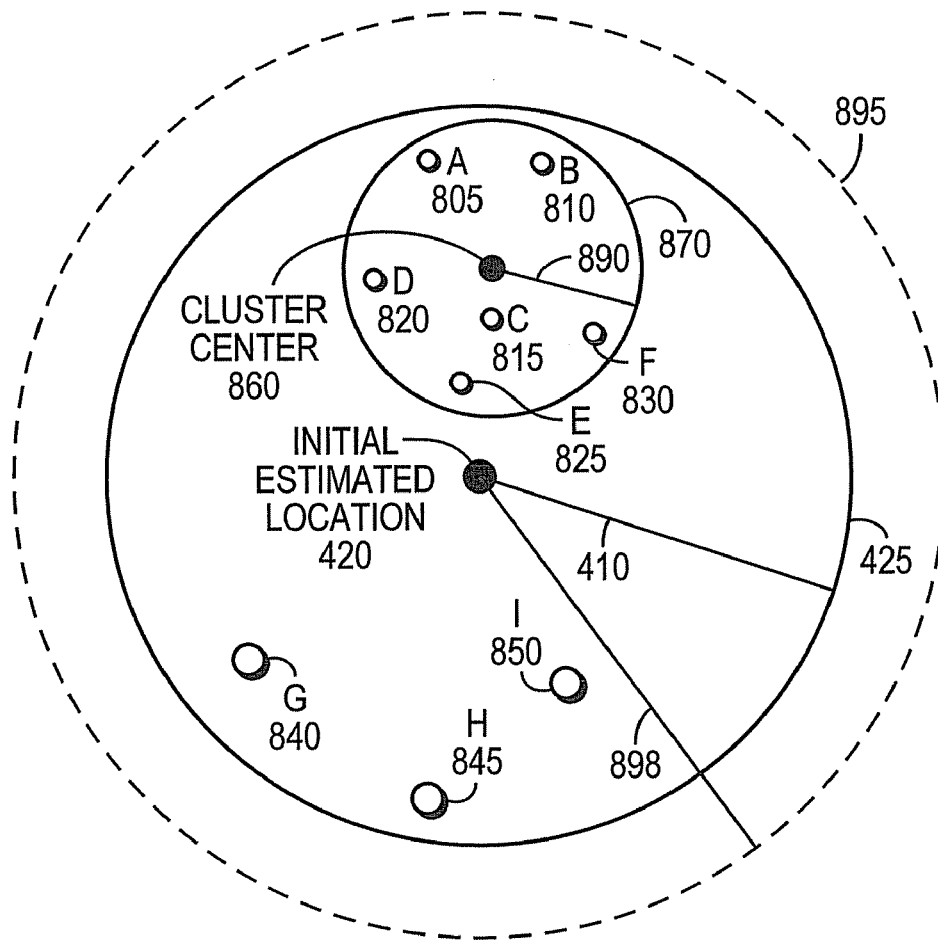
FIG. 8 is a schematic diagram illustrating the use of one or more landmark clusters by a location pattern module.

A location pattern module 625 of the Likelihood Engine 610 may operate on the assumption that if there are clusters of previously visited landmarks around the initial estimated location, it is more likely that a user of the device 200 is located at a landmark in a cluster, than at a landmark remote to a cluster. For example, in reference to FIG. 8, landmarks A 805, C 815, D 820 and F 830 represent places previously visited (within a predetermined timeframe) by the user of the device 200. Such visits may be recorded in the location history database 190 maintained by a server 130. A cluster may be established about a cluster center 860 and extend along a radius 890 to a cluster perimeter 870. The cluster perimeter includes landmarks A 805, C 815, D 820 and F 830, as well as other landmarks, such as previously non-visited landmarks B 810 and E 825. All the landmarks 805-830 within the cluster perimeter 870 may be accorded a greater likelihood value than landmarks remote from the cluster, such as landmarks G 840, H 845 and 1850.

The assumptions underlying the location pattern module 625 typically are best suited for use with LDMs that have a relatively low accuracy, such that a sufficient number of locations fall within the accuracy perimeter 425 to establish one or more clusters. However, in some cases, the module 625 may be used with LDMs having greater accuracy by considering previously visited landmarks beyond the accuracy perimeter 425 for the limited purpose of identifying clusters. Accordingly, the below discussed "search area" 895 may coincide with the accuracy perimeter 425, or may be defined differently.

Figure 9:
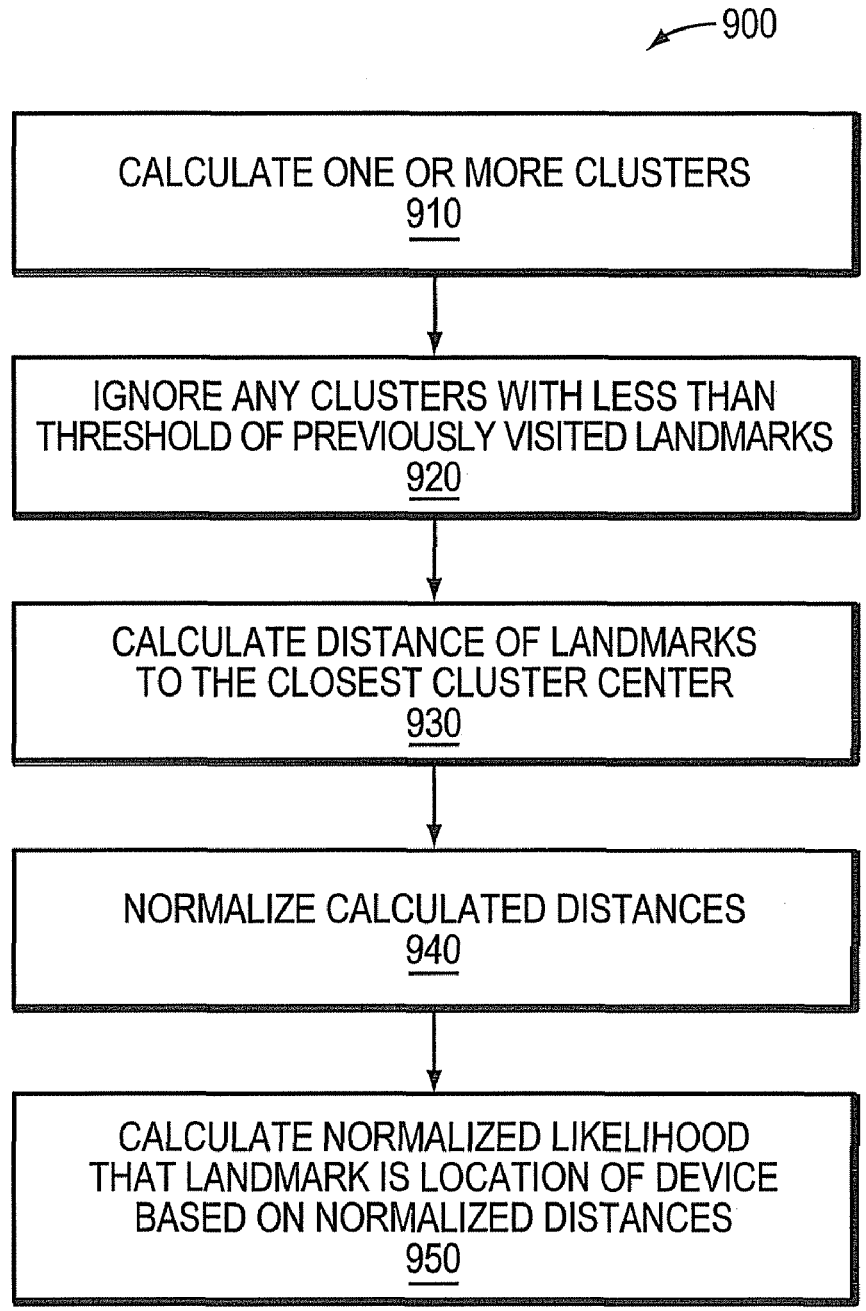
FIG. 9 is a flow diagram of an example sequence of steps that may be executed by a location pattern module to produce a likelihood value.

More specifically, FIG. 9 is a flow diagram of an example sequence of steps 900 that may be executed by the location pattern module 625 to produce likelihood values based upon a location pattern. At step 910, a clustering algorithm is employed to determine one or more clusters within, or at least partially within, the accuracy perimeter 425, considering landmarks within the search area 895. In one implementation, the clustering algorithm is a quality threshold (QT) clustering algorithm.

A QT clustering algorithm advantageously does not require specification of a number of clusters a priori. In general the algorithm takes as an input a maximum cluster extent, which here may be envisioned as the cluster radius 890. In one implementation, the cluster radius 890 is specified to be one half the radius 898 of the search area 895. However, it is expressly contemplated that other implementations may define the cluster radius differently. The QT clustering algorithm builds a candidate cluster for each previously visited landmark 805, 815, 820, 830, by including the closest previously visited landmark, the next previously visited landmark, and so on, until the distance to the next landmark surpasses the cluster extent. The algorithm saves the candidate cluster with the most landmarks as a first true cluster, and removes all landmarks in this cluster from further consideration. The algorithm then recurses, using the reduced set of landmarks. One or more clusters may be returned as a final result. Further details regarding QT clustering algorithms may be found in *Exploring Expression Data: Identification and Analysis of Coeexpressed Genes*, by Heyer, L. J., Kruglyak, S. and Yooseph, S., Genome Research, 9:1106-1115 which is incorporated herein by reference.

Alternatively, rather than utilize a QT clustering algorithm, a variety of other clustering algorithms may be employed. For example, a K-mean clustering algorithm, a fuzzy c-means clustering algorithm, and/or another type of clustering algorithm may be used.

At step 920, clusters that include less than a predetermined threshold of previously visited landmarks may be ignored. At step 930, for the remaining clusters, the distance from each landmark in the initial set of landmarks to the closest cluster center is calculated. At step 940, these distances are normalized by division by a maximum possible distance. For example, in one implementation the maximum possible distance may be two times the radius 898 of the search area 895. At step 950, a normalized likelihood is calculated for each landmark, indicating the likelihood that the landmark is the actual location of the device 200.

Such sequence of steps may be embodied in the equation:

$$L_{Location\_Cluster} = 1 - \frac{dist(landmark, cluster\_center)}{2 * search\_radius} \qquad (4)$$

where $L_{Location\_Cluster}$ represents the normalized likelihood, dist is a distance function, landmark is the location of a landmark of the initial set of landmarks, cluster_center is the location of the nearest cluster center, and search_radius is the search radius 898.

Time Pattern Module

A time pattern module 630 of the Likelihood Engine 610 may operate on the assumption that if a user of the device 200 usually visits a certain type of landmark around the same time of day, it is more likely that the device 200 is located at that type of landmark at about that time, than at a different type of landmark. The time of previous visits may be recorded in the location history database 190. Types of landmarks may be determined in a variety of different manners. The type of a landmark may be determined by parsing the landmark's name. For example, a name that includes the words "restaurant," "diner," "bistro," etc. may be classified as "restaurant" type landmarks. Similarly, the type of a landmark may be determined by looking to an assigned category. For example, landmarks may be stored in categorized data records within the location history database 190. In yet another alternative, the type of a landmark may be determined by looking to an associated type identifier that has either been manually, or automatically, assigned to the landmark.

Figure 10:
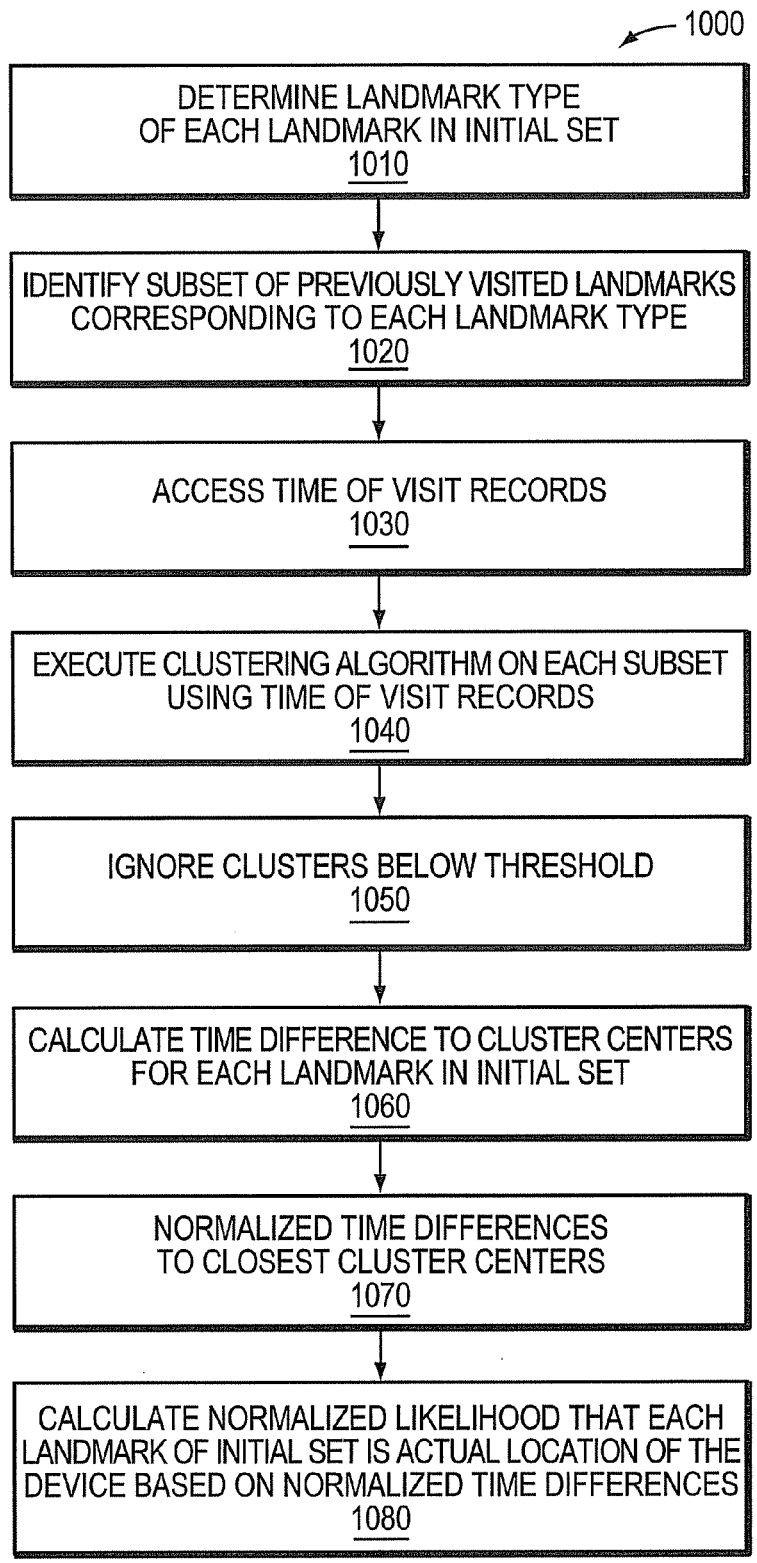
FIG. 10 is a flow diagram of an example sequence of steps that may be executed by a time pattern module to produce a likelihood value based on temporal clusters.

In one implementation, the time pattern module 630 calculates the likelihood that each landmark is the actual location of the device 200 employing a clustering algorithm similar to that employed in the location pattern module 625 discussed above. FIG. 10 is a flow diagram of an example sequence of steps 1000 that may be executed by a time pattern module 630 to produce a likelihood value based on temporal clusters. At step 1010, for each landmark in the initial set of landmarks, a landmark type is determined. At step 1020, a subset of previously visited landmarks (from the location history database 190) is identified that corresponds to each landmark type. At step 1030, for each previously visited landmark in each subset, time-of-visit records are accessed. At step 1040, a clustering algorithm is executed on each subset of landmarks and time-of-visit records associated therewith. For example, a QT clustering algorithm, a K-mean clustering algorithm, a fuzzy c-means clustering algorithm, and/or another type of clustering algorithm may be employed. At step 1050, clusters returned by the clustering algorithm are analyzed and any clusters that include less than a predetermined threshold of visits are ignored. At step 1060, for the remaining clusters, a time difference from the present time to a time associated with the cluster center is calculated. At step 1070, for each landmark, the time difference to the closest cluster center is normalized, for example, by dividing by a maximum possible time difference (e.g., 12 hours). At step 1080, these normalized time differences are used to calculate likelihoods each landmark of the initial set is the actual location of the device 200.

Such a sequence of steps may be embodied in the equation:

$$L_{Time\_Cluster} = 1 - \frac{dist(current\_time, cluster\_center)}{max\_time\_difference} \qquad (5)$$

is where $L_{Time\_Cluster}$ represents the normalized likelihood that a landmark in the initial set is the actual location of the mobile electronic device 200, dist is a time distance function, e.g., a time difference, current_time is a time associated with the initial estimated location 420, cluster_center is a time associated with the cluster center of the closest cluster, and max_time_difference is a predetermined maximum possible time difference used to normalize the results.

Such technique may be modified in various ways, to tune the algorithm and yield improved results. For example, an adjustment factor may be included based upon how closely a landmark matches a landmark type. For example, if landmark type is determined by parsing a landmark's name, a closeness of match may be based on the specific match words, or the number of match words, that are found. Similarly, if type is determined by categorization within a location history database 190, category hierarchies may be employed. A match at a "super-category" level may represent only a general thematic relation, while a match at a "sub-category" level may represent a more concrete relation. A graph distance may be calculated that represents the closeness of match. Then, based on the closeness of match, the likelihood adjusted. Alternatively, the size of a cluster may be used to adjust the likelihood. For example, if the closest cluster is a "large" cluster, an upwards adjustment may be made reflecting higher probabilities. If the closest cluster is a "small" cluster, a downwards adjustment may be made.

Figure 11:
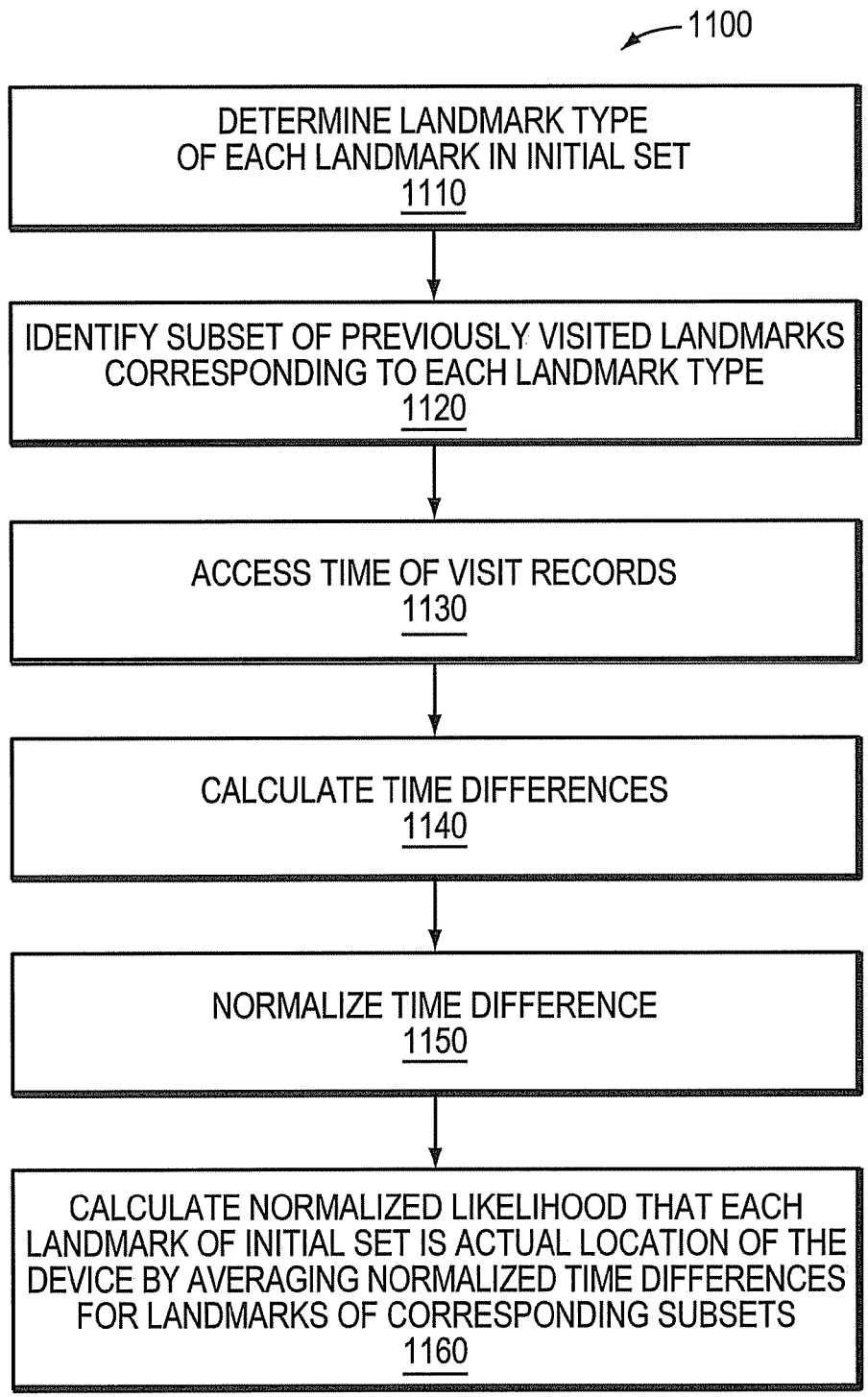
FIG. 11 is a flow diagram of an example sequence of steps that may be executed by a time pattern module to produce likelihood values based on average distance.

In another implementation, the time pattern module 630 may calculate the likelihood that each landmark is the actual location of the mobile electronic device 200 by looking to average distances. FIG. 11 is a flow diagram of an example sequence of steps 1100 that may be executed by a time pattern module 630 to produce likelihood values based on average distances. At step 1110, for each landmark in the initial set of landmarks, a landmark type is determined. At step 1120, a subset of previously visited landmarks is identified that corresponds to each landmark type. At step 1130, for each previously visited landmark in each subset, time-of-visit records are accessed. At step 1140, for each previously visited landmark in each subset, a time difference is calculated between the time associated with that landmark and a time associated with the initial estimated location. At step 1150, these time differences are normalized, for example, divided by a maximum possible time difference (e.g., 12 hours) and inverted. At step 1160, the normalized time differences for each previously visited landmark in each subset are averaged to determine a likelihood that the landmark of the initial set associated with the subset is the actual location of the mobile electronic device 200.

Business Hour Module

Figure 12:
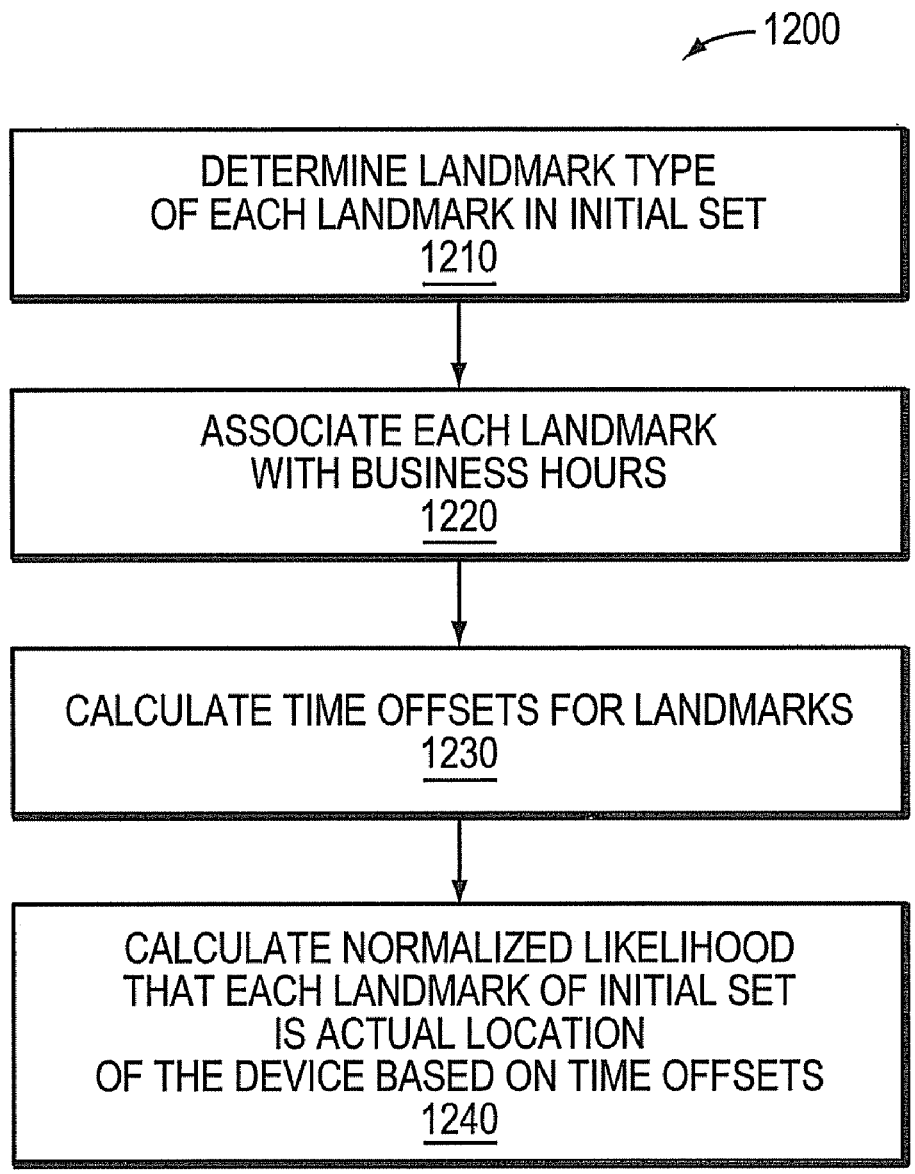
FIG. 12 is a flow diagram of an example sequence of steps that may be executed by a business hour module to produce likelihood values.

A business hour module 635 of the Likelihood Engine 610 may operate on the assumption that it is more likely that a user of the device 200 is visiting a landmark where the current time falls within the landmark's business hours, than a landmark where the current time is outside the business hours. That is, it is more likely that a user is at a landmark that is likely "open," than at one that is likely "closed." FIG. 12 is a flow diagram of an example sequence of steps 1200 that may be executed by a business hour module 635 to produce likelihood values. At step 1210, for each landmark in the initial set of landmarks, a corresponding landmark type is determined. At step 1220, each landmark is associated with a predefined set of business hours for that landmark type. For example, a landmark type corresponding to "business facilities" may be associated with predefined business hours of 8:00 am to 5:00 pm, while a landmark type corresponding to "retail" may be associated with predefined business hours of 9:00 am to 9:00 pm. At step, 1230 a time offset for that landmark is calculated by taking the difference of the time associated with the initial estimated location and the nearest business hour cutoff. For example, if the time associated with the initial estimated location was 5:15 pm, and the business hours were 8 am to 5 pm, a difference of 15 minutes would be calculated. For times which fall within the business hours, the time offset would be zero. At step 1240, each time offset is normalized, for example, by division by a maximum time offset and subtraction from one, to determine a likelihood that each landmark of the initial set of landmarks is the actual location of the mobile electronic device 200. The likelihood will be assigned a high value, for example a value of one, when within the business hours, while a lesser value is assigned when outside of business hours.

The steps discussed above may be embodied in the equation:

$$L_{Business\_Hours} = 1 - \frac{time\_offset}{max\_time\_offset} \quad (6)$$

where $L_{Business\_Hours}$ represents the normalized likelihood that a landmark in the initial set is the actual location of the mobile electronic device 200, time_offset is the difference of a time associated with the initial estimated location and the nearest business hour cutoff, and max_time_offest is a predetermined maximum time offset used to normalize and/or otherwise adjust the results.

It should be apparent that various modifications and additions may be made to the above described business hour module 635. For example, rather than use predefined business hours for location types, business hours for specific establishments may be obtained, for example, by querying a preloaded database, parsing data available on websites associated with establishments, querying a user, or by other techniques. Similarly, adjustments may be made for times proximate to the beginning and end of business hour periods, so that such scenarios are not unduly penalized in the algorithm.

Other Probability Modules

An event module 640 of the Likelihood Engine 610 may operate on the assumption that it is more likely that a user of the device 200 is visiting a place that hosts events during an event, than that the user is visiting a place that host events when no event is occurring. Such module 640 may operate in a similar manner to the business hour module 635 discussed above. Rather than business hours, event hours may be obtained for each landmark of the initial set that hosts events. Event hours may be obtained by querying an event database, for example, the event database commercially available from Eventful, Inc. of San Diego, Calif., an event database provided by another similar service provider, or by other techniques. Therafter, an equation similar to equation (6) above may be employed.

A season/weather module 645 of the Likelihood Engine 610 may operate on the assumption that it is more likely that a user of the device 200 is visiting a weather-dependent place in appropriate weather conditions, than in inappropriate weather conditions. For example, it is more likely that a user is visiting an outdoor recreational site, such as a beach or a park, if it is sunny and warm, than if it is cold and snowing. Such module 645 may assume certain appropriate season and weather conditions based upon event types determined according to the techniques discussed above. Further, current weather information for the vicinity about the initial estimated location 420 may be obtained by querying a weather database, for example the weather database commercially available from AccuWeather, Inc. of State College, Pa., from a database provided by another similar service provider, or by other techniques.

A common place names module 650 of the Likelihood Engine 610 may operate on the assumption that it is generally more likely that a user of the device 200 is visiting a landmark with a certain place name, than a landmark with another name. For example, a list of certain common place names, such as "home," "office," "work," etc., may be established for places where users tend to be located for much of their time. Landmarks in the initial set with names that match, or include, these common place names may be accorded a favored status, and assigned higher likelihood values than other landmarks.

Further, a repeatedly visited places module 655 of the Likelihood Engine 610 may operate on the assumption that it is generally more likely that a user of the device 200 is returning to a previously visited place than is visiting a new place. Accordingly, a general algorithm may be employed where previously visited landmarks (as indicated by the location history database 190) are accorded a higher likelihood than landmarks that have not been previously visited.

A variety of other type of probability modules may be employed in place of, or in addition to, the example modules discussed above. Accordingly, the present disclosure is intended to embrace such alternative configurations.

CONCLUSION AND ADDITIONAL ALTERNATIVE CONFIGURATIONS

The foregoing has been a detailed description of several embodiments. Further modifications and additions may be made without departing from the disclosure's intended spirit and scope.

For example, certain overriding rules are discussed above as preempting the results returned from the Likelihood Engine 610. Alternatively, such rules may be incorporated into separate probability modules incorporated into the Likelihood Engine 610, serving as one factor among many, rather than overriding other results.

Further, while it is discussed above that a single LDM is used to determine the initial estimated location, a combination of two or more LDMs may be employed. In such cases, the accuracies of the two or more LDMs may be combined to determine an appropriate accuracy radius 410.

Further, it will be understood that many of the above techniques may be implemented in hardware (for example in programmable logic circuits, specially-designed hardware chips, analog or partially-analog devices, and other types of devices), in software (for example in applications having computer-executable instructions stored on computer-readable media for execution on a computing device), or in a combination of hardware and software. Accordingly, it should be understood that the above descriptions are meant to be taken only by way of example, and not restricted to a particular implementation mode.

What is claimed is:

1. A computer-implemented method for determining the location of a mobile electronic device, comprising:
   obtaining an initial estimated location of the mobile electronic device determined using a location determination method (LDM);
   determining an existence of a cluster of multiple previously visited landmarks, the cluster of previously visited landmarks being located proximate to the initial estimated location, the cluster of previously visited landmarks including more than a threshold number of previously visited landmarks;
   calculating a distance to the cluster;
   selecting a landmark associated with the cluster based, at least in part, on the existence of the cluster of previously visited landmarks; and
   providing a known location of the selected landmark associated with the cluster as the location of the mobile electronic device.

2. The computer-implemented method of claim 1 further comprising:
   determining an accuracy of the LDM; and
   basing the determination of the cluster of previously visited landmarks on the determined accuracy of the LDM.

3. The computer-implemented method of claim 2 wherein the cluster of previously visited landmarks is located at least partially within an accuracy perimeter associated with the LDM.

4. The computer-implemented method of claim 1 further comprising:
   determining an initial set of landmarks based on the initial estimated location;
   for each landmark in the initial set of landmarks, determining a first likelihood that the mobile electronic device is located about that landmark according to a first algorithm that involves existence of a cluster of previously visited landmarks;
   for each landmark in the initial set of landmarks, determining a second likelihood that the mobile electronic device is located about that landmark according to a different second algorithm;
   for each landmark in the initial set of landmarks, aggregating the first likelihood and the second likelihood in calculating an aggregated corresponding likelihood that the mobile electronic device is located about that landmark; and
   selecting the selected landmark from the initial set of landmarks based on the is aggregated corresponding likelihoods.

5. The computer-implemented method of claim 4 wherein the step of aggregating further comprises:
   computing a weighted average of the first likelihood and the second likelihood.

6. The computer-implemented method of claim 4 wherein selecting a landmark from the initial set of landmarks further comprises:
   determining a confidence in the selected landmark; and
   in response to the confidence, either automatically using the selected landmark or prompting a user for input.

7. The computer-implemented method of claim 4 wherein determining a second likelihood that the mobile electronic device is located about that landmark according to a different second algorithm further comprises:
   calculating a distance from the initial estimated location to that landmark; and
   basing the corresponding second likelihood of that landmark, at least in part, on the calculated distance from the initial estimated location to that landmark.

8. The computer-implemented method of claim 4 wherein determining a second likelihood that the mobile electronic device is located about that landmark according to a different second algorithm further comprises:
   determining a landmark type for that landmark;
   identifying a cluster of previously visited landmarks of the landmark type;
   comparing a time associated with that landmark to a time associated with a cluster center of the cluster; and
   basing the corresponding second likelihood of that landmark, at least in part, on the comparison.

9. The computer-implemented method of claim 4 wherein determining the second likelihood that the mobile electronic device is located about that landmark according to the different second algorithm further comprises:
   determining a landmark type for that landmark;
   identifying previously visited landmarks of the landmark type;
   comparing a time associated with that landmark to times associated with the previously visited landmarks; and
   basing the corresponding second likelihood of that landmark, at least in part, on the comparison.

10. The computer-implemented method of claim 4 wherein determining the second likelihood that the mobile electronic device is located about that landmark according to the different second algorithm further comprises:
    determining a landmark type for that landmark;
    associating that landmark with business hours;
    comparing a time associated with the initial estimated location to the business hours; and
    basing the corresponding second likelihood of that landmark, at least in part, on the comparison.

11. The computer-implemented method of claim 1 further comprising:
    determining the mobile electronic device was within a same vicinity for at least a certain period of time; and
    in response thereto, preempting use of the landmark associated with the cluster as the selected landmark, and providing a last known location of the mobile electronic device as the location of the mobile electronic device.

12. The computer-implemented method of claim 1 further comprising:

determining the mobile electronic device was within a same vicinity and at least a particular number of last known user-selected locations are identical; and in response thereto, preempting use of the landmark associated with the cluster as the selected landmark, and providing a last known location of the mobile electronic device as the location of the mobile electronic device.

13. The computer-implemented method of claim 1 wherein the LDM is the Assisted Global Positioning System (A-GPS).

14. The computer-implemented method of claim 1 wherein the mobile electronic device is a cellular telephone.

15. The computer-implemented method of claim 1 wherein the location of the mobile electronic device is provided to a location based service (LBS) that provides at least one of location-specific information, location-specific notifications and location-specific interactive capabilities to a user.

16. An apparatus for determining the location of a mobile electronic device, comprising:
    a server capable of communicating with the mobile electronic device, the server executing a location determination application operable to,
        determine an existence of a cluster of multiple previously visited landmarks, the cluster of previously visited landmarks being located proximate to an initial estimated location of the mobile electronic device, the cluster of previously visited landmarks including more than a threshold number of previously visited landmarks,
        calculate a distance to the cluster,
        select a landmark associated with the cluster based, at least in part, on the existence of the cluster of previously visited landmarks, and
        provide a location of the selected landmark associated with the cluster as the location of the mobile electronic device.

17. The apparatus of claim 16 wherein the location determination application is configured to determine an initial set of landmarks based on the initial estimated location, and the location determination application further comprises a modular likelihood engine having,
    a first module configured to determine a first likelihood that the mobile electronic device is located about a particular landmark by using a first algorithm that involves existence of a cluster of previously visited landmarks,
    a second module configured to determine a second likelihood that the mobile electronic device is located about the particular landmark by using a to second different algorithm, and
    an aggregation engine configured to combine the first likelihood and the second likelihood to calculate an aggregated corresponding likelihood that the mobile electronic device is located about the particular landmark.

18. A computer-readable storage medium comprising instructions for execution on a processor for determining the location of a mobile electronic device, the instructions operable to:
    receive an initial estimated location of the mobile electronic device determined by a location determination method (LDM);
    calculate a cluster of multiple previously visited landmarks, the cluster of previously visited landmarks being located proximate to the initial estimated location, the cluster of previously visited landmarks including more than a threshold number of previously visited landmarks;
    calculate a distance to the cluster;
    select a landmark associated with the cluster based, at least in part, on the existence of the cluster of previously visited landmarks;
    associate the selected landmark with the mobile electronic device; and
    provide the location of the associated landmark.

19. The computer-readable storage medium of claim 18 further comprising instructions operable to:
    determine an accuracy of the LDM; and
    base the calculation of the cluster of previously visited landmarks on the determined accuracy of the LDM.

20. The computer-readable storage medium of claim 18 further comprising instructions operable to:
    determine an initial set of landmarks based on the initial estimated location;
    determine a first likelihood that the mobile electronic device is located about a particular landmark according to a first algorithm that involves existence of a cluster of previously visited landmarks;
    determine a second likelihood that the mobile electronic device is located about the particular landmark according to a second different algorithm;
    aggregate the first likelihood and the second likelihood in calculating an aggregated corresponding likelihood that the mobile electronic device is located about the particular landmark; and
    select the selected landmark from the initial set of landmarks based on the aggregated corresponding likelihoods.

21. The computer-readable storage medium of claim 20 wherein the instructions operable to determine the second likelihood that the mobile electronic device is located about the particular landmark according to the different second algorithm further comprise instructions operable to:
    calculate a distance from the initial estimated location to the particular landmark; and
    base the corresponding second likelihood for the particular landmark, at least in part, on the calculated distance from the initial estimated location to the particular landmark.

22. The computer-readable storage medium of claim 20 wherein the instructions operable to determine the second likelihood that the mobile electronic device is located about the particular landmark according to the different second algorithm further comprise instructions operable to:
    determine a landmark type for the particular landmark;
    identify a cluster of previously visited landmarks of the landmark type;
    compare a time associated with the particular landmark to a time associated with a cluster center of the cluster; and
    basing the corresponding second likelihood for the particular landmark, at least in part, on the comparison.

23. The computer-readable storage medium of claim 20 wherein the instructions operable to determine the second likelihood that the mobile electronic device is located about the particular landmark according to the different second algorithm further comprise instructions operable to:
    determine a landmark type for the particular landmark;
    identify previously visited landmarks of the landmark type;
    compare a time associated with the particular landmark to times associated with the previously visited landmarks; and base the corresponding second likelihood for the particular landmark, at least in part, on the comparison.

24. The computer-readable storage medium of claim 20 wherein the instructions operable to determine the second likelihood that the mobile electronic device is located about the particular landmark according to the different second algorithm further comprise instructions operable to:

determine a landmark type for the particular landmark;

associate the particular landmark with business hours;

compare a time associated with the initial estimated location to the business hours; and base the corresponding second likelihood for the particular landmark, at least in part, on the comparison.

25. The computer-readable storage medium of claim 18 further comprising instructions operable to:

determine the mobile electronic device was within a same vicinity for at least a certain period of time; and in response thereto, preempt use of the landmark associated with the cluster as the selected landmark, and provide a last known location of the mobile electronic device as the location of the mobile electronic device.

26. The computer-readable storage medium of claim 18 further comprising instructions operable to:

determine the mobile electronic device was within a same vicinity and at least a particular number of last known user-selected locations are identical; and in response thereto, preempt use of the landmark associated with the cluster as the selected landmark, and provide a last known location of the mobile electronic device as the location of the mobile electronic device.

* * * * *